United States Patent

Wyatt

[15] 3,652,033
[45] Mar. 28, 1972

[54] MAGNETIC HYSTERESIS-LOSS DAMPING RODS

[72] Inventor: Theodore Wyatt, Union Bridge, Md.

[73] Assignee: The United States of America as represented by the Secretary of the Navy

[22] Filed: Mar. 25, 1970

[21] Appl. No.: 22,471

[52] U.S. Cl. ............................244/1 SA, 188/1 B, 310/105
[51] Int. Cl. ...........................................................B64g 1/00
[58] Field of Search .....................244/1 SS, 1 SA; 188/1 B; 310/93, 105

[56] References Cited

UNITED STATES PATENTS 3,190,581  6/1965  Wilson, Jr. ...........................244/1 SA
3,363,856  1/1968  Tossman et al. ......................244/1 SA
3,114,518  12/1963  Fischell................................244/1 SA Primary Examiner—Milton Buchler
Assistant Examiner—Jeffrey L. Forman
Attorney—Richard S. Sciascia and J. A. Cooke

[57] ABSTRACT

An improved damping rod structure, for dissipating undesired satellite motion by magnetic hysteresis and shorted coil damping, which provides increased damping capability for a given weight of magnetically permeable material. In one embodiment, a damping rod comprises an outer sleeve of electrically conductive material, an intermediate sleeve of magnetically permeable material, and an inner rod or sleeve of electrically conductive material, the structure acting both as a shorted coil and as a rigid support for the intermediate sleeve.

4 Claims, 6 Drawing Figures

INVENTOR.
THEODORE WYATT

INVENTOR.
THEODORE WYATT

MAGNETIC HYSTERESIS-LOSS DAMPING RODS

BACKGROUND AND SUMMARY OF THE INVENTION

Control of satellite motion is accomplished by reaction to an exerted force. In the environment of a satellite, some entitiy must be chosen against which that force may be exerted. Although several media, such as gas molecules, photons, or the earth's gravitational field, are available in the environment of an earth satellite to be acted against, the relatively large force that can be exerted on the satellite through use of the earth's magnetic field causes this media to be one of the most feasible means for motional control.

Attitude stabilization of the final stage of rocket propulsion during orbital injection is frequently accomplished by spinning the rocket stage and attached satellite about the thrust axis during launch. Since the frequency of the radio transmission from an orbiting satellite is modulated by the spin rate of the satellite, this motion must be removed from orbiting vehicles which require a high order of frequency stability. In order to remove these disruptive satellite motions, various damping systems have been provided. Of particular utility are the electromagnetic induction damping systems, as revealed by Fischell in U. S. Pat. No. 3,114,518. Fischell discloses de-spin rods comprised of magnetically permeable material surrounded by shorted coils and which dissipate satellite spin energy as short-circuited induced currents and as magnetic hysteresis losses.

The present invention provides damping rods for removing undesirable satellite motion, the rods being comprised of an assembly of magnetically permeable material and electrically conductive material for dissipating energy both by short-circuited induced currents and by hysteresis losses. In particular, the invention provides an improved damping rod structure conveniently mountable within the solar panel blades of a satellite. In one form of the invention, a central rod of magnetic hysteresis material is surrounded by a sleeve of electrically conductive material, such as aluminum, which acts as a shorted coil and also provides protection and structural rigidity to the rod, the rod itself being fragile and vulnerable to damage to its magnetic character. The present rod structure may be readily inserted into a satellite solar panel blade with minimum displacement in the blade.

A second form of the invention provides rods comprising an outer sleeve of electrically conductive material, an intermediate sleeve of magnetically permeable material, and an inner rod or sleeve of electrically conductive material, thereby lending additional structure stability to the damping rod. Moreover, the tubular configuration of the magnetically permeable hysteresis material increases its length to diameter ratio, relative to that of a solid rod, and thereby increases the hysteresis loss capability of a given weight of the magnetic material. Alternatively, the benefit can be realized as a reduction in weight for a fixed amount of hysteresis loss capability.

An additional feature of the invention is the provision of enlarged plug or cap members composed of material having high magnetic permeability and disposed on the ends of the damping rod. The additional structure provides a low reluctance connection to the earth's magnetic field, thereby producing a higher flux density in the magnetic hysteresis material and increasing the damping effect.

The magnetically permeable material in each of the forms of the invention functions to subject the adjacent electrically conductive material to changes in magnetic flux, thereby producing currents by Faraday electromagnetic induction which are short-circuited within the electrically conductive material. Thus, "shorted-coiled" damping as well as hysteresis damping is accomplished with the present damping rod structure.

Accordingly, it is an object of the invention to provide apparatus by the use of which the magnetic field of the earth is utilized to control the angular motions of an earth satellite.

A further object of the invention is to provide a damping rod structure for effecting hysteresis and shorted coil damping of an earth satellite.

It is another object of the invention to provide a damping rod structure of increased structural rigidity, said structural rigidity being caused by functional components of the rod structure, thereby minimizing component weight, allowing more compact disposition of the rods aboard a satellite, and lessening the possibility of damage to the rods.

DESCRIPTION OF THE PREFERRED EMBODIMENTS

Figure 1:
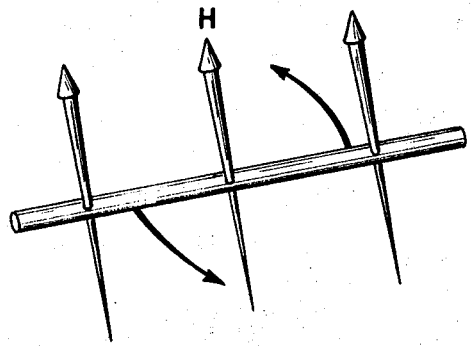
FIG. 1 is a representation of a permeable rod spinning in a magnetic field.

FIG. 1 illustrates the well-known effect of a rod rotating in the earth's magnetic field. As the rod rotates, it experiences a magnetic field along its length which varies sinusoidally at the rate of spin and with a peak amplitude equal to the intensity of the earth's magnetic field normal to the axis of spin. As the magnetic rod undergoes changes in the magnetic field, it traverses its hysteresis loop. The rate of energy loss per cycle is proportional to the area of the hysteresis loop. This loss is given by the equation $$E = -V/4\pi \int H dB$$

where $H$ = magnetic field intensity (earth)
$B$ = magnetic induction flux density (rod)
$V$ = total volume of the magnetic rods, and
$\int H dB$ = area of the hysteresis loop The quantity of energy removed in each cyclic transverse is independent of the speed of the traverse.

Figure 2:
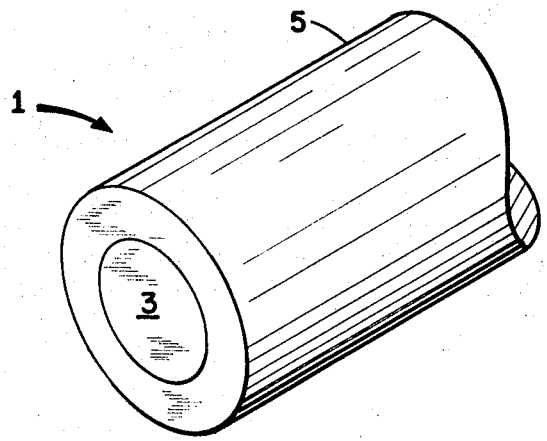
FIG. 2 is an enlarged perspective of an end portion of a first embodiment of the present damping rod structure and illustrating the internal structure thereof at the exposed end.

Certain materials exhibit a hysteresis loss greater than that of other materials. Thus, a magnetically permeable, lossy material, such as Permalloy or AEM-4750 (an alloy of 47.5 percent iron), is advantageously used to form a central rod 3 of the present damping rod structure shown at 1 in FIG. 2. The central rod 3, in this first embodiment of the invention, is enclosed within a tubular sleeve 5 composed of electrically conductive material, such as aluminum. Thus, the central rod 3 of the rod structure 1 is capable of providing damping of satellite motion in hysteresis fashion according to the function for hysteresis loss given above. Additionally, with provision of the electrically conductive tubular sleeve 5 surrounding the rod 3, shorted coil damping may be accomplished in a manner to be described hereinafter. The tubular sleeve 5 provides the additional advantages of lending structural rigidity to the rod 3 and of allowing the structure 1 to be easily mounted with minimum displacement within the solar panel blade of a satellite.

Figure 3:
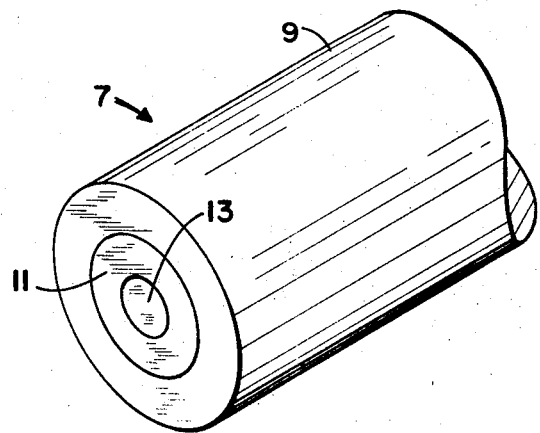
FIG. 3 is an enlarged perspective of an end portion of a second embodiment of the invention and illustrating the internal structure thereof at the exposed end of the rod.

A second embodiment of the invention is shown in FIG. 3, wherein a damping rod structure 7 comprises an outer sleeve 9 of electrically conductive material, an intermediate sleeve 11 of magnetically permeable material, and an inner rod 13 of electrically conductive material. In the embodiment shown, the intermediate sleeve 11 of magnetically permeable material primarily functions to subject the adjacent electrically conductive members to changes in magnetic flux in order to produce currents therein by Faraday electromagnetic induction, which are short-circuited thereby producing shorted coil damping of satellite motion. Additionally, the sleeve 11 functions to provide magnetic hysteresis loss in the manner described above.

The outer sleeve 9 and inner rod 13 are preferably formed of aluminum in order to lend structural rigidity to the damping rod structure 7, thus minimizing the weight of said structure and allowing rapid and simplified disposition thereof within a satellite, such as in the arm of a solar panel blade. Aside from the structural advantage provided, the sleeve 9 and rod 13 act in concert with the magnetically permeable sleeve 11 as the electrical conductors required to produce shorted coil damping.

Figure 4:
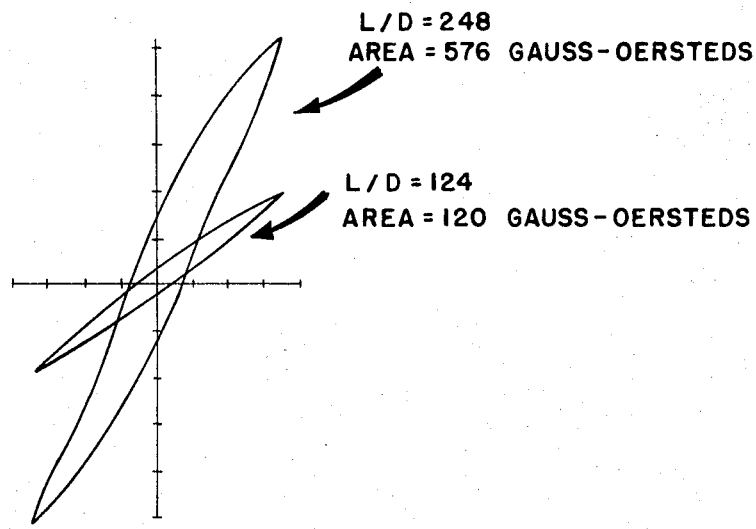
FIG. 4 is a graphical comparison of the hysteresis loops for two permeable rods having different length to diameter ratios.

Returning to the discussion of hysteresis loss afforded by the rotation of a rod in the earth's magnetic field, it is noted that an optimum length to diameter ratio L/D can be selected for the magnetically permeable rod. Although total hysteresis loss is proportional to the volume (or weight) of the rods, increasing the length to diameter ratio for a fixed volume results in an increased hysteresis loss due to improved effectiveness. An illustration of the effect of length to diameter ratio on hysteresis loss is shown in FIG. 4.

Both rods tested were of the same diameter, one rod being twice as long, hence having twice the volume of the other rod. The longer rod had an L/D ratio of 248 and was found to have a hysteresis loop area 4.8 times as great as the rod with the L/D ratio of 124. The effectiveness of a rod in removing energy is proportional to both volume and loop area. Therefore, it is inferred that a rod with an L/D ratio of 248 is 4.8 times as effective per unit volume or unit weight as a rod with an L/D ratio of 124. The embodiment of the present invention shown in FIG. 3 exhibits, due to the provision of the inner rod 13, an increased L/D ratio and thus increased hysteresis loss capability relative to a solid rod of magnetically permeable material having the same amount of material.

Considering hysteresis damping only, the spin rate of a satellite as a function of time is $$f = f_o - \frac{k_h}{4\pi^2 I} t \text{ (r.p.s.)}$$

where $k_h$ is the damping coefficient $$k_h = \frac{1.844}{\pi} nV \langle \oint HdB \rangle \times 10^{-8} \text{ (ft.-lbs.)} \quad (5)$$

In the above equations
$\langle \oint HdB \rangle$ = average area of the hysteresis loop for the period of one orbit
$I$ = spin moment of inertia of the satellite
$n$ = number of rods in the satellite
$V$ = volume of rod (cm.³) It is seen from the above result that the angular rate of spin of the satellite will decrease linearly with time, and will actually go to zero revolutions per second (with respect to the ambient magnetic field) in a finite time.

As previously mentioned, angular motions of a magnetically permeable rod relative to the earth's magnetic field produce changes in the induced magnetic flux density within the rod. A magnetic state in the rod produces an external magnetic field surrounding the rod and this external field varies proportionally with the internal changes. In accordance with Faraday's Law this changing external field produces an electromotive force or voltage in an electrical conductor located within the field. The open-circuit electromotive force $e_0$ is equal to
$-d\Phi/dt$
where $d\Phi/dt$ is the rate of change with time of the external field $\Phi$ of the rod coupled to the conductor. If the conductor is short-circuited through its internal resistance, $r$, the rate of energy expenditure, $E$, at given instant is $$\frac{dE}{dt} = \frac{e_o^2 k}{r} = \frac{k}{r}\left(\frac{d\Phi}{dt}\right)^2$$

where $k$ is a constant. It can be shown that rate of energy dissipation, or damping, averaged over the cycle of variation in $\Phi$ is $$dE_{avg}/dt = -K \langle \Phi^2 \rangle f^2$$

wherein $\langle \Phi^2 \rangle$ represents the average value of $\Phi^2$ and $f^2$ represents the frequency with which $\Phi$ undergoes cyclic variation. The constant, $k$, incorporates the fixed properties of a particular rod and conductor configuration. As a consequence of the $f$ relationship, shorted coil damping is more effective at high angular rates, magnetic hysteresis damping being more effective at low angular rates. Unlike the linear spin rate decrease associated with hysteresis damping shorted coil damping produces an exponentially decreasing spin rate. Given a fixed weight or volume of an electrically conductive material, the average energy change, dE, with respect to time is unaffected by the use of the metal in the form of either a moderate number of turns of coarse wire extending over the cylindrical side of the rod, a large number of turns of fine wire, or a continuous, thin-walled cylinder. Thus, using the present damping rods, shorted coil damping is also accomplished without additional structure, particularly without providing wound coils around the magnetically permeable material of the rods.

Figure 5:
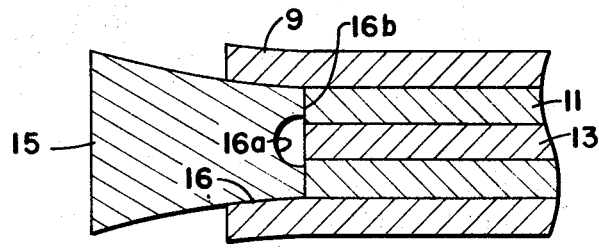
FIG. 5 is a detail section of the second embodiment of the invention and further illustrating the provision of an end plug of high permeability magnetic material on the rod; and, FIG. 6 is a detail section of the first embodiment of the invention and further illustrating the provision of an end cap of high permeability magnetic material on the rod.
Figure 6:
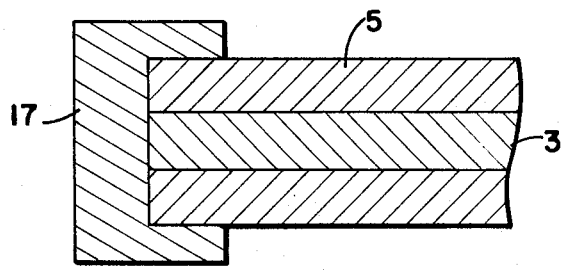

Since the enhancement of electromagnetic induction damping may often be preferred at the expense of hysteresis loss capability, the choice of a magnetically permeable material may be conditioned more by a desire for high permeability rather than for large hysteresis loss. In addition to a choice of the magnetically permeable material, high flux density may be obtained in the ferromagnetic material by providing a plug 15, as shown in FIG. 5, or a cap 17, as shown in FIG. 6, on the ends of the rod assemblies shown respectively in FIG. 3 and FIG. 2. In FIG. 5, the rod assembly of FIG. 3 is provided with the plug 15. A socket 16 for receiving the plug 15 is formed by extending the sleeve 9 beyond the sleeve 11 and rod 13. The inner end of the plug is formed with an axial recess 16a which defines a rim 16b. The plug 15 thus engages the sleeve 11 without touching the rod 13. The plug 15 and cap 17 are formed from magnetic material having a high permeability, thus causing a higher flux density within the damping rod structure than would be obtainable without the added structure. This increased flux density results from the ability of the plug 15 or cap 17 to provide a low reluctance connection to the earth's field.

The use of permeable rods with a shorted coil capability to provide damping of satellite spin has distinct advantages, particularly as practiced in the present invention. Since aluminum sleeves are used to function as electrical conductors, the present damping rods are lighter in weight and may be more easily insertable into a reduced volume in a satellite than prior rods having wound coils. Additionally, the damping effects produced by the present rods do not require the use of moving parts or a source of driving power, thereby dependably and efficiently stabilizing the angular motion of satellites in space.

I claim:

1. Apparatus for damping angular motions of an orbiting satellite, comprising
   a rod of magnetically permeable material;
   a rigid sleeve of electrically conductive material fitted about the rod; and,
   a cap of magnetically permeable material fitted on the sleeve and engaging the rod.

2. Apparatus for damping angular motions of an orbiting satellite, comprising
   a sleeve of magnetically permeable material;
   a conductive sleeve of electrically conductive material fitted about and extending beyond said first-mentioned sleeve to define a socket; and,
   a plug of magnetically permeable material mounted in the socket and engaging the first-mentioned sleeve.

3. The apparatus of claim 2, including additional electrically conductive material mounted within the sleeve of magnetically permeable material.

4. The apparatus of claim 3, wherein said electrically conductive material consists of a rod.

* * * * *